(12) United States Patent
Bowles (10) Patent No.: US 9,727,707 B2
(45) Date of Patent: Aug. 8, 2017

(54) SYSTEM AND METHOD FOR MANAGING, TRACKING, AND UTILIZING COPY AND/OR PASTE EVENTS

(71) Applicant: Erica Christine Bowles, University Parkway, FL (US)

(72) Inventor: Erica Christine Bowles, University Parkway, FL (US)

( * ) Notice: Subject to any disclaimer, the term of this patent is extended or adjusted under 35 U.S.C. 154(b) by 291 days.

(21) Appl. No.: 14/550,548

(22) Filed: Nov. 21, 2014

(65) Prior Publication Data

US 2015/0143534 A1     May 21, 2015

Related U.S. Application Data

(60) Provisional application No. 61/907,029, filed on Nov. 21, 2013.

(51) Int. Cl.
| | |
|---|---|
| *G06F 21/10* | (2013.01) |
| *G06Q 50/18* | (2012.01) |
| *G06Q 30/02* | (2012.01) |

(52) U.S. Cl.
CPC ............ *G06F 21/105* (2013.01); *G06F 21/10* (2013.01); *G06Q 30/0277* (2013.01); *G06Q 50/184* (2013.01)

(58) Field of Classification Search
CPC ..................................................... G06F 21/105

USPC ........................................................... 726/26
See application file for complete search history.

(56) References Cited

U.S. PATENT DOCUMENTS

| | | |
|---|---|---|
| 8,275,766 B2 | 9/2012 | Ball et al. |
| 2006/0184454 A1* | 8/2006 | Ananda ................... G06F 21/10 705/57 |
| 2009/0307215 A1 | 12/2009 | Ball et al. |
| 2010/0174708 A1 | 7/2010 | Ball et al. |
| 2011/0082850 A1 | 4/2011 | Ball et al. |
| 2011/0082897 A1 | 4/2011 | Ball et al. |
| 2011/0082898 A1 | 4/2011 | Foster et al. |
| 2011/0276626 A1 | 11/2011 | Ball et al. |
| 2012/0221675 A1 | 8/2012 | Ball |

* cited by examiner

*Primary Examiner* — Jacob Lipman
(74) *Attorney, Agent, or Firm* — The Concept Law Group, P.A.; Scott D. Smiley (57) ABSTRACT

A method of enforcing copyright rights over a distributed computer network includes the steps of transmitting website content to a remote user computer, transmitting computer executable instructions to the remote user computer, the computer executable instructions being operable to identify execution of a copy command applied to at least a portion of the website page content, receiving notification, via the computer executable instructions, of execution of a copy command applied to at least a portion of the website content, receiving identification information associated with either the remote user computer or a user of the remote user computer, and identifying publication of the at least a portion of the website page content.

18 Claims, 3 Drawing Sheets

SYSTEM AND METHOD FOR MANAGING, TRACKING, AND UTILIZING COPY AND/OR PASTE EVENTS

CROSS-REFERENCE TO RELATED APPLICATION

This application claims priority to U.S. Provisional Patent Application No. 61/907,029 filed on Nov. 21, 2013, the entirety of which is incorporated by reference.

FIELD OF THE INVENTION

The present disclosure generally relates to apparatuses and methods for utilizing the electronic transfer of digital information. More particularly, the present disclosure relates to apparatuses and methods for protecting computer-displayable content presented on a website, such as text and images, by preventing copy and/or paste events, immediately notifying a content owner of a copy and/or paste event, immediately notifying a user who initiated a copy and/or paste event with a customized message, tracking pasted content, obtaining and storing information associated with copy and/or paste events in a database, and analyzing and presenting the stored information to a content owner. Additionally, apparatuses and methods are disclosed for displaying targeted advertisements immediately following a copy and/or paste event and an associated revenue-generating model, allowing advertisers to pay a predetermined amount per copy and/or paste event.

BACKGROUND OF THE INVENTION

Websites are a very important aspect of most businesses. A website allows a business to communicate with the general public in an easily accessible manner. Unfortunately, it is a common practice for website viewers to attempt to obtain computer-displayable content that is presented on websites. This content may represent intellectual property or may merely be the result of much work and effort expended by a content owner. As such, it is often undesirable to allow website viewers to simply capture and transfer such content for their own personal or business use without compensation to or permission from the original source of the content. There are several methods of obtaining website content, but the most popular method is by far copying and pasting. Specifically, this typically entails a computer user electronically highlighting desired content on a website, executing a copy command to copy the highlighted content, and subsequently pasting the copied content into another program, such as a word processor or email application.

Thus, a system and method of protecting computer-displayable content and utilizing copy and/or paste events to the benefit of a content owner is needed.

SUMMARY OF THE INVENTION

A method of enforcing copyrights over a distributed computer network includes the steps of receiving website content at a remote user computer, the website content including at least two separate elements, i.e., a graphic, text, a picture, or other typical website content; receiving a first computer executable instruction associated with a first of the at least two separate elements and operable to identify execution of a copy command applied to the first of the at least two separate elements; receiving a second computer executable instruction associated with a second of the at least two separate elements and operable to identify execution of a copy command applied to the second of the at least two separate elements, the second computer executable instruction being different than the first computer executable instruction; identifying, via one of the first computer executable instruction and the second computer executable instruction, a copy command applied to one of the at least two separate elements; and executing one of the first computer executable instruction and the second computer executable instruction in response to the identifying step.

A method of enforcing copyright rights over a distributed computer network includes the steps of transmitting website content to a remote user computer, transmitting computer executable instructions to the remote user computer, the computer executable instructions being operable to identify execution of a copy command applied to at least a portion of the website page content, receiving notification, via the computer executable instructions, of execution of a copy command applied to at least a portion of the website content, receiving identification information associated with either the remote user computer or a user of the remote user computer, and identifying publication of the at least a portion of the website page content.

These and other features, aspects, and advantages of the invention will be further understood and appreciated by those skilled in the art by reference to the following written specification, claims and appended drawings.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "application," "software application," and the like as used herein, are defined as a sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system.

BRIEF DESCRIPTION OF THE DRAWINGS

The invention will now be described, by way of example, with reference to the accompanying drawings, in which.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In order to provide a concise description of the embodiments, not all features of every implementation are described. It is appreciated that in the development of any such implementation, as in any engineering or design project, various implementation-specific decisions are required to be made to achieve specific system-related and business-related goals, which may, of course, vary from one implementation to another. Thus, it is understood by those of ordinary skill in the art that such a development and implementation effort, while possibly being complex and/or time-consuming, is, nevertheless, a routine undertaking of design, fabrication, manufacturing, and development by those of ordinary skill in the art having the benefit of the present disclosure.

Electronic Device

Figure 1:
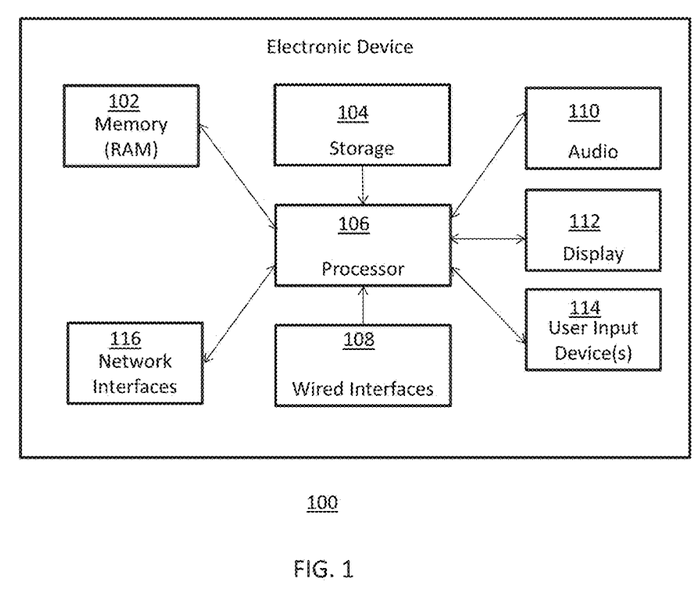
FIG. 1 presents a block diagram of an exemplary electronic computing device, in accordance with an embodiment of the present invention.

An electronic device 100 in the exemplary form of a personal computer is illustrated in the schematic diagram in FIG. 1. It will be appreciated, however, that the exemplary context of a personal computer is not the only operational environment in which aspects of the disclosed systems and methods may be used. Therefore, the techniques described herein, may be applied to any type of appropriate electronic device 100, examples of which include, but are not limited to, a mobile telephone, a media player, a gaming device, a personal data assistant, a smartphone, a computer tablet, or the like. The electronic device 100 can include memory 102, a storage device 104, a processor 106, a wired interface 108, an audio input/output 110, a display 112, a user input device 114, and a network interface 116.

Network

Figure 2:
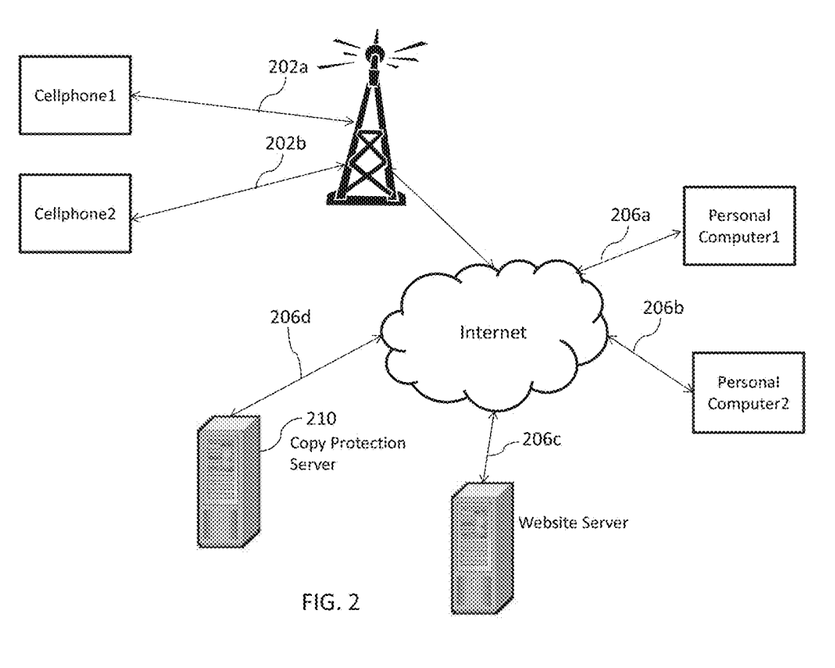
FIG. 2 presents a block diagram of a network operating environment in accordance with an embodiment of the present invention.
Figure 3:
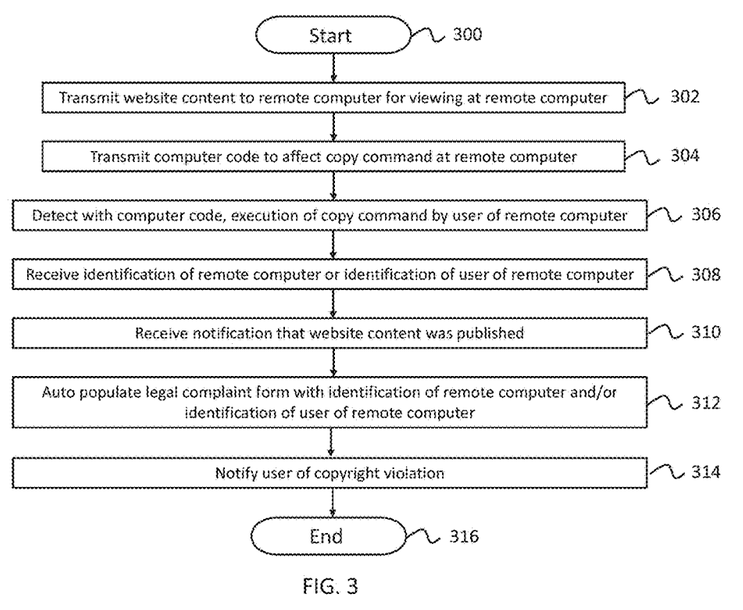
FIG. 3 is a process flow chart illustrating a method of enforcing copyrights over a distributed computer network.

Referring to FIG. 2, there is illustrated a block diagram of an example network operating environment 200 for the apparatuses and methods of the present invention. Various electronic devices are connected over a network. The electronic devices can be personal computers, mobile cellular telephones, smart phones, computer tablets, servers, and the like.

The electronic devices may communicate via a wired or wireless communication link 202a-b, such as radio waves that may be transmitted and received over a network, such as a cellular network having a multitude of nodes, such as cellular towers 204 for receiving and transmitting radio signals over the network. The electronic devices and the cellular network may also communicate with other wide area networks (WAN), such as the Internet, via a communication link 206a-d that may be wired and/or wireless.

A website server may be connected to a network, such as the Internet, for hosting a website able to display computer-displayable content, such as, for example, text, images, video, music files, and the like, via a browser executing on an electronic device, in a manner that is well-known in the art.

The method of protecting computer-displayable content may be managed by a central office housing a computer 210 executing an instruction set for facilitating operation of the methods of the present invention, as will be described in more detail below. The computer 210 may be interconnected with a searchable storage medium for communicating with electronic devices outside of the central office over various wired and wireless networks. The searchable storage medium may be a database and/or a server that stores data collected relating to copy and/or paste events. When copy and/or paste events occurs at electronic devices connected to the network 200, information related to each event is received via the network, and stored in the searchable storage medium. The information may be, for example, an identification of the event (i.e. whether the event is a copy, a paste, an image theft, page ripping, code tampering, and the like), a time stamp representing the time the event occurred, an Internet Protocol (I.P.) address of the electronic device at which the event occurred, and an identification of the operating system operating on the electronic device at which the event occurred. Additional data items may be obtained from the information received, such as, for example, a geological location of the I.P. address and the Internet Service provider facilitating the electronic device's network access, which can be determined in accordance with known methods. Communication of the central office to electronic devices connected to the network may occur via communication links 206 to the Internet.

Methods for Protecting Computer-Displayable Content Presented on a Website

The method of the present invention includes providing a system that allows a website content owner to easily personalize the desired level of protection and the desired action step in response to a copy and/or paste event. The system provides a copy and/or paste protection website that allows a website content owner to easily customize the desired protection level and responses. For example, the website content owner can subscribe to the copy and/or paste protection website, which will allow the website content owner to customize a plug-in designed to protect the owner's website content. The website owner can select prevention of a copy and/or paste event, or tracking of a copy and/or paste event, or both. The website content owner can also personalize a message displayed to a user upon a user-initiated copy and/or paste event. The copy and/or paste prevention website presents a word processing editor that allows the website owner to paste images, such as a business logo or a deterring image, and type text, such as, for example, a message that "copying and pasting from the website is prohibited" and "the content is protected intellectual property." The message can include a notice that a legal team has been notified of the copy attempt in order to act as an additional deterrent. The customized message, sign, or placard is then automatically displayed on the electronic device that initiated the copy and/or paste event immediately upon the occurrence of a copy and/or paste event. The message can be implemented as a separate pop-up window or an overlay image that is superimposed over the displayed website page. After the website content owner selects the desired level of protection and the desired response, the copy and/or paste prevention website automatically generates a software component, such as for example, a plug-in, that the website content owner can easily download into their website. The plug-in will modify the website functionality to incorporate the selected protection features and customized message.

The system will additionally collect data associated with attempts to copy and/or paste content from the website owner's website, analyze the collected data, and present the analyzed data to assist the website owner with utilizing such information, for example, for determining who is performing the most copy and/or paste functions, what content is being copied the most, and the like.

In the exemplary implementations described below, the methods presented will be described with reference to a copy and/or paste event executed by a user on a personal computer. However, it is understood that electronic devices are not limited to a personal computer and is merely for exemplary purposes.

Preventing Unauthorized Copy and/or Paste Events

A user operating on a personal computer connected to a network, such as the Internet, may enter a website of a content owner via a browser operating on the personal computer. As is known in the art, the browser transmits a request to the server hosting the website, requesting the website's content. The plug-in operating the method of protecting computer-displayable content, as described herein, is included in the website's content. The website server transmits the website content, including the plug-in, which is downloaded and stored on the personal computer and displayed via the browser operating on the personal computer. The plug-in may include one or more listening functions that detect and respond to specific user-initiated events, such as, for example, a copy event.

The plug-in may disable execution of the copy command for any copy commands executed on the website. This prevents a user from copying content directly from the website via the browser. The user may right-click on an image on the website and select the "copy" command, in accordance with well-known methods. The listening function will detect the unauthorized user-initiated copy event.

Immediately following a triggering event, such as the attempt to execute the copy command, a placard of the website owner's customized message is displayed on the personal computer. The placard can be, for example, a separate pop-up window or an overlay image superimposed on at least a portion of the website page. In one implementation, the code for the placard is already included in the website's source code, but is merely set to invisible. When a triggering event occurs, such as a copy event, the code is set to visible and the placard is displayed to the user. In response to the triggering event, a tracking pixel can also be generated, as will be described in more detail below.

In another implementation, a copy command may be enabled, but a "paste" command is disabled to prevent pasting any copied content. It is known that common methods of copying and pasting involve a "right-click" event in order to select a copy or paste command. Thus, in yet another implementation, the "right-click" command is disabled. Other commonly used commands that may be disabled include highlighting, dragging, printing, and the like. Printing may include printing to another file format, such as, for example portable document format (PDF), or printing a hard copy. It is well-known that different browsers operate differently, thus, the plug-in may attempt to detect the type of browser that is being used and execute a separate disable function for each browser type.

In yet another implementation, a website content owner may choose to charge a fee for copied content. In this implementation, the placard includes a hyperlink that directs the user to a web page where the user must provide payment in order to copy and/or paste the selected content. Once payment is processed, the copy command may be enabled.

Notifying a Content Owner of a Copy and/or Paste Event

When the website content owner is customizing the desired protection level and message to generate the customized software component (e.g. plug-in), the website content owner can enter contact information, such as a business or personal phone number and email address. This contact information can be used to automatically contact the website content owner (or a website administrator) of an unauthorized copy, paste, right-click, or other event that was detected. For example, a text message to a cellular telephone and/or an email can be sent automatically notifying the website content owner of an unauthorized copy event. The message can also include information associated with the event, such as, for example, the time of the event, the content attempted to be copied, an I.P. address of the electronic device at which the event occurred, and a geological location of the I.P. address.

Tracking Pasted Content

It is desirable for a website content owner to be able to track content that has been copied and pasted from his or her website and subsequently transferred one or more times to an editor, such as Microsoft Word, Outlook, or other websites, blogs, and the like. For example, a user may pay for the privilege of copying and pasting an image from the website, as discussed above. The user may paste the copied image into Outlook and email the image to a friend. The friend may operate a blog and subsequently copy and/or paste the image into his blog. A blog viewer who writes articles for a newspaper's website may then copy and/or paste the image into the news article posted on the newspaper's website. Clearly, the copied content is receiving multiple uses, which do not benefit the original source of the content. Thus, an exemplary method of tracking pasted content through multiple copy and/or paste events is described herein below.

A first user operating on a first computer connected to a network, such as the Internet, may enter a website of a content owner via a browser operating on the first computer. The first user may highlight text displayed on the website in the form of a news article. After highlighting the selected text, the first user may "right-click" and then select the "copy" command, in accordance with well-known methods. When the copy command is executed, the selected text is transmitted by the computer to a clipboard buffer of the first computer.

The plug-in will append a tracking pixel element to the selected content so that the tracking pixel element is also transmitted to the clipboard buffer of the first computer. In one implementation, the plug-in will include a function that listens or waits for a copy event. When the listening function detects a copy event, the selected text along with a tracking pixel element is sent to the clipboard of the local computer. Thus, when the user paste's the clipboard contents, the tracking pixel element is pasted as well as the selected text. The tracking pixel element may be dynamically created by the plug-in upon detection of a triggering event, such as a detected copy event, or the tracking pixel element may be statically created by the plug-in, A tracking pixel element is a HyperText Markup Language (HTML) image element that is dynamically or statically created at the client or local computer operating the browser displaying the associated website. As is known in the art, HTML is a core markup language used for creating web pages that can be displayed in a web browser. The tracking pixel element may include an image link to a 1×1 transparent image stored on a server, such as the server hosting the method of protecting computer-displayable content. In some embodiments, the "transparent image" may not be an actual image. For example, in one implementation, the "transparent image" is a Hypertext Preprocessor (PHP) server-side script that collects and stores data to the server's database and then sends image data back to the requesting client computer. In this implementation, no actual images are included in the process. The HTML image link may include a URL string and a function that acquires data from the client or local computer. The URL address associated with the image link may be dynamically or statically generated by the plug-in and may include identifying information, such as the type of triggering event (e.g. copy, paste, code tampering, etc.) that caused the tracking pixel element to be generated, the URL of the computer attempting to download the transparent image, etc. The tracking pixel image may be stored as a .gif, .jpeg, .png, .tiff or any other image file format.

After executing the copy command, the first user will execute a paste command in an editor (operating on the first computer), such as an email application, and the contents of the clipboard buffer of the first computer, including the HTML image link, will be pasted into the editor. Many editors are compatible with HTML and will attempt to resolve image links Thus, the editor will read the image link and request the 1×1 transparent image from a second computer, such as the server hosting the method of protecting computer-displayable content. In one implementation, the request from first computer will include identifying information in, for example, the header of the request. The second computer is then able to obtain data from the requesting first computer, such as a time stamp, an I.P. address, a geological location of the I.P. address, identification of the copied content, etc. This data is stored in a database of the second computer for collection and analysis. The second computer then transmits the transparent image to the editor, satisfying the request. Because the image is transparent, anyone viewing the copied content is not aware of the presence of the tracking pixel.

The copied content with tracking pixel element is pasted into an email and sent to a second user. The second user operating on a third computer copies the content (with tracking pixel element) and pastes the copied content into a website blog via a browser on the third computer. The browser will attempt to resolve the image link by sending a request for the image from the third computer to the second computer, i.e. the server hosting the method of protecting computer-displayed content. Again, the second computer receives data from the requesting third computer, such as a time stamp, an I.P. address, a geological location of the I.P. address, identification of the copied content, etc. This data is stored in the database of the second computer for collection and analysis. The second computer then transmits the transparent image to the browser operating on the third computer, satisfying the request. Because the image is transparent, the second user viewing the copied content is not aware of the presence of the tracking pixel.

In this manner, computer-displayable content that is copied and pasted multiple times on several different computers can be tracked.

The plug-in may also be configured to detect and track unauthorized copy and/or pastes of the plug-in computer code. A hidden element may be embedded in the plug-in computer code, similar to the tracking pixel technology described above. The hidden element may also include a reference to the original URL of the website at which the plug-in is authorized to operate. When a browser reads the plug-in code including the hidden element, a comparison of the current URL operating the plug-in and the original URL is performed. If the URL's do not match, a request is sent to the server hosting the method of protecting computer-displayable content. As described above, the server is then able to obtain data from the requesting computer, such as an I.P. address, thereby detecting and tracking an unauthorized copy and/or paste of the plug-in computer code.

Collecting, Analyzing, and Presenting Data Associated with Copy and/or Paste Events to a Content Owner All of the data collected from computers that have initiated an unauthorized copy and/or paste event are stored in a database on a server. The data can include, but is not limited to, the date and time of the event, the universal resource locator (URL) of the web page at which an unauthorized copy and/or paste event was attempted, the I.P. address of the computer or electronic device that initiated the event, the geological location of the I.P. address, and the website content that was attempted to be obtained.

A website content owner that has downloaded a customized copy protection plug-in into his or her website, as discussed above, may view all of the collected data via a website. The website may be hosted by the server hosting the method of protecting computer-displayed content. The analyzed data may be presented in a graphical form, such as a pie graph, bar graph, line graph, a spreadsheet, and the like. For example, the website may display a line graph representing all of the copy and/or paste events, or alerts, which occurred each day over a prolonged period of time. Such a graph can allow a website content owner to view trends, such as determining whether the copy protection plug-in has decreased the amount of copy-paste events over time. The website may display a daily report of all of the unauthorized events, such as copy events, paste events, image theft, page ripping, and code tampering. The website may display a list of the top I.P. addresses, which have attempted the most unauthorized events. This analytics feature provides a website content owner with information presented in a user-friendly format that will allow the website content owner to utilize the collected data to his or her own benefit.

Displaying Targeted Advertisements Immediately Following a Copy and/or Paste Event One method of utilizing copy and/or paste events to the benefit of a content owner is to display targeted advertisements upon a copy and/or paste event, rather than a deterring message, as discussed above. The method may include the step of receiving a user-initiated command, such as a copy and/or paste command executed on a browser operating on a first computer. After receiving the command, the first computer automatically displays the advertisement. The advertisement can be displayed as a separate pop-up window or an overlay image superimposed over the current web page. It is understood that other user-initiated commands may cause an automatic display of an advertisement, including but not limited to right-clicks, highlighting, dragging, and printing. Printing may include printing to another file format, such as, for example PDF, or printing a hard copy.

In one implementation, the plug-in will include a function that listens or waits for a triggering event, such as a copy event. When the listening function detects a copy event, the selected text along with instructions for displaying the advertisement is sent to the clipboard of the first computer. Thus, when the user paste's the clipboard contents, the advertisement is displayed as well.

The advertisement may be provided by the website owner or the advertisement may be provided by a separate sponsor that has or will pay a predetermined fee for the advertisement. The predetermined fee may be a specific amount to be paid for each advertisement message that is displayed upon a user-initiated copy and/or paste event. The advertisement may include advertising text and associated images.

In an exemplary implementation, the advertisement may be stored on a second computer, operating as a server. The website may include a software component, such as a plug-in, discussed above, that commands the first computer to send a request to the second computer to receive the advertising text and associated images for display on the first computer. Upon receiving the request, the second computer sends the advertising text and associated images to the first computer. The first computer displays the advertising text and associated images via a browser operated by the first computer. The second computer records this event and an identification of the advertisement sent. This data is stored in a database on the second computer to keep track of how many of a particular advertisement was sent in order to calculate the total fee owed by the sponsoring entity.

The advertisement may be associated with the particular copied content or the advertisement may have no association with the particular copied content. For example, the owner of a website that provides public interest and other news articles may be scheduled to post an article about the quality of drinking water in a particular city. The business owner may then approach several businesses associated with water filters. One of the water filter businesses may agree to pay a nominal fee each time an advertisement is presented after a copy and/or paste event. The water filter business entity will then send a computer-displayable advertisement, which the website owner will upload to the second computer. In accordance with the methods and apparatuses described above, a water filter advertisement message will be displayed each time a copy and/or paste event of the water quality article is detected. Each of the detected events is stored on the second computer and an invoice generated calculating the fee for each detected event. In this manner, website content owners are able to receive a benefit from content posted on their website, which is copied and pasted by users viewing the website.

Method of Copyright Protection

In another embodiment, the method of protecting computer-displayable content can be implemented to protect copyrights associated with the computer-displayable content. In one embodiment, a website displaying copyrighted content, such as news articles, copyrighted images and photographs, artwork, stories, and the like, can install the plug-in. The plug-in will allow copy and/or paste events to be detected and tracked. In a further embodiment, upon detection of an unauthorized copy and/or paste of copyright protected content on the website, a communication can be automatically sent to a computer associated with a copyright attorney, or other copyright protection professional, the communication including an indication that an unauthorized copy and/or paste of copyright protected content has occurred. The communication can also include, for example, an I.P. address of a computer that executed the copy and/or paste event, an identification of the copied content, a URL address or other identification of the website whose content was copied, and a time indicating when the content was copied, and the like. This information can be used to obtain contact information for the individual associated with the copying computer to communicate with the individual, by, for example, notifying the individual of the copyright rights associated with the copied content, sending a cease and desist letter, and the like. In one embodiment, the communication is performed automatically via email. In another embodiment, unauthorized republication of the copied content, such as by posting the copied content on a blog, social networking website, or other website, can automatically result in communication to the computer associated with the copyright attorney, the communication including an indication that an unauthorized republication of the copied content has occurred. In further embodiments, the communication can include an identification of the location of the unauthorized republication, such as, for example, the URL address of the website where the copied content was republished. In yet another embodiment, the communication can include an identification of the republished content and a time indicating when the copied content was republished. Such information can be used by the copyright attorney to automatically file a copyright infringement lawsuit against the individual who copied and/or pasted the content, the owner of the website where the copied content was republished, and/or the owner of the server system on which the website with the copied content is hosted. In one embodiment, preparation of the legal forms/documents for the lawsuit is automatically performed by a software application operating on the computer associated with the copyright attorney. The software application can have template legal forms/documents and use the communicated information, such as the URL address, I.P. address, identification of the copied and republished content, times associated with the copy and republication events, and the like, to populate fields within the templates. In a further embodiment, the software application can automatically generate the populated legal forms and documents and electronically file the law suits with said forms and documents. This inventive method provides copyright owners with an automatic and convenient process for deterring and enforcing their valuable copyright rights, which is particularly vulnerable to infringement via the Internet.

Short Code

WYSIWYG is an acronym for "What You See Is What You Get." In computing, a WYSIWYG implies a user interface that allows the user to view something very similar to the end result while the document is being created. In general WYSIWYG implies the ability to directly manipulate the layout of a document without having to type or remember names of layout commands.

In accordance with an embodiment, the present invention appends a code, in a preferred embodiment, the code is a "short code" to a particular object that will be rendered on a webpage. For convenience, this code can be added through the WYSIWYG to each object in a highly customized manner. This way, when a webpage is rendered on a remote user computer, each object on the rendered page can have its own code. The code will dictate what action takes place when the user's mouse is over that object or the object is highlighted and the copy command is initiated by the user. For example, by appending a code to each object on the page, a user might be allowed to copy text, but a notification is transmitted back to the server identifying the computer, e.g., IP address, or the copy function has been executed. Because each item has its own short code, the identification can also include the specific content being copied. In this example, the user might not be told that anything took place. Once the level of copying reached a significant level, legal action could be taken. By identifying the time/date, the computer identifier, and the content identification, a specific legal claim could be made against the user. As another example, a different element on the very same webpage, e.g., a picture, could be protected differently. For instance, a different piece of code attached to a photograph could cause text to appear on the screen warning the user that copying is not allowed while simultaneously preventing the copy function from executing properly. For another element, such as a graphic, for example, the code could replace the copy buffer with some other image so that when the user it's the paste function, some other content is pasted other than the graphic the user intended to copy.

Another example of how a single webpage featuring a plurality of elements, at least two of which having its own specific short code, would be advantageous as a page it features multiple articles. It is possible that some of the articles can be copied freely without concern. Other articles, may require the author's consent before others can copy. Yet, for other articles, the page owner may want the user to be presented with a subscribe or payment option when they try to copy the content, but allows the copy function to take place anyway. By appending a short code to each object on the page, the protection becomes highly customizable.

The present invention, through the use of the above described codes, i.e., short codes, also provides a novel way of policing the theft of copy written material. For example, a newspaper might publish an article that contains text in the photograph. The text may be written by an employee of the newspaper while the photograph may be one that the newspaper purchased a license to. The photographer granting a license to the newspaper may require that the newspaper attach a short code to that element when it publishes it on the newspaper's webpage. When someone visiting the newspaper's website tries to copy the photograph, the instruction provided by the short code may be that identification information is sent immediately to a third-party, such as a law firm, identifying the attempted copying of that photograph. The identifying information can include the IP address or other identifying information of the user's computer and/or the user, the time the photograph was copied, in which photograph was copied. This information will allow the owner of the photograph to enforce his or her copyrights on the photograph.

It is further possible to identify when the photograph or other content was published online through various methods. These include, use of a tracking pixel, as described above, use of a bot that searches the web for image or other comparisons methods, use of hidden information in the photograph that is locatable by a bot searching the web, use of short codes identifying a paste and/or publication command, and others. With the above-described identifying information at the time of copying, it will be easier to locate and identify the time/date of the unauthorized publication and identity of the publisher.

As another example, an online newspaper publisher might wish for some content to be protected and other content not to be protected. For example, it would like for its advertisers content to be copied, while maintaining protection for the original content created by the newspaper. By using customizable short codes for each element, the newspaper can now select from numerous ways to respond to a copy command performed by a visitor of the website. By adding the short codes to the WYSIWYG editor in, for example, Word Press, or other webpage editing software programs, the publisher can be presented with a selection of check boxes on how each piece of content should be protected. For example, one piece of content could be protected by a short code that simply does not allow anything to take place when the user hits the copy command. For other content, when the copy command is identified, information is sent directly to the newspaper's law firm so that a file can be created in copyright enforcement can begin.

On the law firm's side, the information would not be available for detectable without the present invention. This information, which is sent automatically, could be stored and further investigated to see when the copied information is actually published. This can include a second notifier, which, together with the first notification, could be used to populate a lawsuit complaint.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method of enforcing copyrights over a distributed computer network, the method comprising the steps of:

receiving website content at a remote user computer, the website content including at least two separate elements;

receiving a first computer executable instruction at the remote user computer, the first computer executable instruction being associated with a first of the at least two separate elements and operable to identify execution of a copy command applied to the first of the at least two separate elements;

receiving a second computer executable instruction at the remote user computer, the second computer executable instruction being associated with a second of the at least two separate elements and operable to identify execution of a copy command applied to the second of the at least two separate elements, the second computer executable instruction being different than the first computer executable instruction;

identifying, via one of the first computer executable instruction and the second computer executable instruction, a copy command applied to one of the at least two separate elements, the copy command associated with a copy buffer on the remote user computer; and executing one of the first computer executable instruction and the second computer executable instruction in response to the identifying step.

2. The method according to claim 1, further comprising:
sending to a remote computing device identification information associated with at least one of:
the element on which the copy command was applied;
the remote user computer; and
a user of the remote user computer.

3. The method according to claim 1, wherein the at least two separate elements comprise text, graphics, or photographs.

4. The method according to claim 1, wherein:
the first computer executable instruction is a short code applied to a first of the at least two elements.

5. The method according to claim 1, wherein:
the first computer executable instruction is an instruction to replace the copy buffer on the user computer with content that varies from the one of the at least two separate elements upon which the copy command was applied.

6. The method according to claim 1, wherein:
the first computer executable instruction is an instruction to display a message on the user's computer.

7. A method of enforcing copyrights over a distributed computer network, the method comprising the steps of:
transmitting website content to a remote user computer;
transmitting computer executable instructions to the remote user computer, the computer executable instructions being operable to identify execution of a copy command applied to at least a portion of the website page content, the copy command associated with a clipboard buffer on the remote user computer;
receiving notification, via the computer executable instructions, of execution of a copy command applied to at least a portion of the website content;
receiving identification information associated with at least one of:
the remote user computer; and
a user of the remote user computer; and
identifying publication of the at least a portion of the website page content.

8. The method according to claim 7, wherein:
the transmitting website content to a remote user computer is in response to receiving a Hypertext Transfer Protocol (HTTP) request message from the remote user computer.

9. The method according to claim 7, wherein:
the computer executable instructions are at least part of the website's computer code.

10. The method according to claim 7, wherein:
the computer executable instructions are at least partially supplied to the website by a plug in software component.

11. The method according to claim 7, wherein:
the computer executable instructions include a protocol for the exchange of data with a server hosting the website.

12. The method according to claim 7, wherein:
the computer executable instructions are executed by a web browser.

13. The method according to claim 7, wherein:
a user of the remote user computer is not informed of the receiving notification step until the identifying publication step is complete.

14. The method according to claim 7, wherein:
the identification information is an Internet Protocol (IP) address.

15. The method according to claim 7, wherein:
the computer executable instructions are operable to execute an instruction that notifies a third party upon identification of a paste command at the user computer.

16. The method according to claim 7, further comprising:
upon identifying execution of the copy command, appending a tracking pixel element to the copied at least a portion of the website content such that the tracking pixel element is also received into the clipboard buffer of the user computer.

17. The method according to claim 16, wherein:
the tracking pixel element includes an image link to a tracking pixel image stored on a remote computer.

18. The method according to claim 17, further comprising:
receiving a request for the tracking pixel image at the computer identified by the image link.

* * * * *